United States Patent
Ueno

(10) Patent No.: US 12,363,421 B2
(45) Date of Patent: Jul. 15, 2025

(54) IMAGING DEVICE, CONTROL METHOD OF IMAGING DEVICE, AND NON-TRANSITORY COMPUTER READABLE MEDIUM

(71) Applicant: CANON KABUSHIKI KAISHA, Tokyo (JP)

(72) Inventor: Daiyu Ueno, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 164 days.

(21) Appl. No.: 18/459,647

(22) Filed: Sep. 1, 2023

(65) Prior Publication Data
US 2024/0080549 A1  Mar. 7, 2024

(30) Foreign Application Priority Data
Sep. 7, 2022  (JP) .................................. 2022-142176

(51) Int. Cl.
| | |
|---|---|
| *H04N 23/63* | (2023.01) |
| *H04N 1/00* | (2006.01) |
| *H04N 23/62* | (2023.01) |
| *H04N 23/667* | (2023.01) |
| *H04N 101/00* | (2006.01) |

(52) U.S. Cl.
CPC ....... *H04N 23/631* (2023.01); *H04N 1/00244* (2013.01); *H04N 23/62* (2023.01); *H04N 23/667* (2023.01); *H04N 2101/00* (2013.01); *H04N 2201/0084* (2013.01)

(58) Field of Classification Search
CPC .... H04N 1/00244; H04N 23/62; H04N 23/63; H04N 23/631; H04N 23/633; H04N 23/667; H04N 2201/0084
See application file for complete search history.

(56) References Cited

U.S. PATENT DOCUMENTS

| | | | |
|---|---|---|---|
| 2018/0324347 A1* | 11/2018 | Shimosato | H04N 23/633 |
| 2019/0079941 A1* | 3/2019 | Sarkar | G06F 16/7864 |
| 2019/0199913 A1* | 6/2019 | Ueno | H04N 23/635 |
| 2022/0321924 A1* | 10/2022 | Toshima | H04L 65/402 |

FOREIGN PATENT DOCUMENTS

JP  2020-113898 A  7/2020

* cited by examiner

*Primary Examiner* — Daniel M Pasiewicz
(74) *Attorney, Agent, or Firm* — Cowan, Liebowitz & Latman, P.C.

(57) ABSTRACT

An imaging device includes: a controller configured to perform control of each of a moving image capturing mode, in which a captured moving image is recorded as a moving image file, and a live distribution mode, in which a captured moving image is live-distributed to an external device; and an operation interface configured to be used for a user to input a stop instruction. In a case where the controller receives the stop instruction from the operation interface in the live distribution mode, the controller performs control of executing stopping confirmation processing for confirming with the user whether to stop moving image capturing before stopping the moving image capturing. In a case where the controller receives the stop instruction from the operation interface in the moving image capturing mode, the controller performs control of stopping the moving image capturing without executing the stopping confirmation processing.

13 Claims, 13 Drawing Sheets

IMAGING DEVICE, CONTROL METHOD OF IMAGING DEVICE, AND NON-TRANSITORY COMPUTER READABLE MEDIUM

BACKGROUND OF THE INVENTION

Field of the Invention

The present invention relates to an imaging device, a control method of the imaging device, and a non-transitory computer readable medium.

Description of the Related Art

In general, a digital camera is equipped with a moving image capturing function in addition to still image capturing. In moving image capturing, moving image data recorded by an imaging element is saved in a temporary storage area and then written in a recording medium such as a memory card or a hard disk in a main body. In recent years, with moving image distribution services becoming more prevalent via the Internet, it has become common for individuals to distribute live videos. Thereby, the number of digital cameras having a function of performing live distribution of a moving image during capturing, in addition to writing moving image data to a recording medium, has increased.

Regarding such distribution of live videos, Japanese Patent Application Publication No. 2020-113898 proposes a method of distributing a live video in real time while using a self-timer function to prevent reflection of a hand.

In the middle of moving image capturing, the capturing may be unintentionally interrupted by a user's erroneous operation. In particular, there has recently been an increase in the number of imaging devices that allow inputs of instructions to start or stop capturing by touch operations on a touch screen, but such user interfaces tend to cause erroneous operations.

With normal moving image capturing, even when an unintended interruption occurs, an impact thereof is small because recovery is possible by re-capturing or moving image editing. However, an unintended interruption occurring in the case of live distribution may cause trouble for viewers of a live video, which may lead to a serious situation. Although a live distribution method is mentioned in the related art proposed in Japanese Patent Application Publication No. 2020-113898, no measures have been taken against the stopping of distribution due to an erroneous operation.

SUMMARY OF THE INVENTION

The present invention has been made in view of the above-described circumstances, and provides technology making it possible to curb unintended interruption of live distribution due to an erroneous operation as far as possible without impairing the operability of moving image capturing.

The present disclosure includes an imaging device capable of capturing a moving image, the imaging device including: a storage configured to be capable of storing data non-temporarily; a communication interface configured to be capable of transmitting data to an external device; a controller configured to perform control of each of a plurality of modes including a moving image capturing mode, in which a captured moving image is recorded as a moving image file in the storage, and a live distribution mode, in which a captured moving image is live-distributed to the external device via the communication interface; and an operation interface configured to be used for a user to input a stop instruction, wherein in a case where the controller receives the stop instruction from the operation interface in the live distribution mode, the controller performs control of executing stopping confirmation processing for confirming with the user whether to stop moving image capturing before stopping the moving image capturing, and in a case where the controller receives the stop instruction from the operation interface in the moving image capturing mode, the controller performs control of stopping the moving image capturing without executing the stopping confirmation processing.

Further features of the present invention will become apparent from the following description of exemplary embodiments with reference to the attached drawings.

DESCRIPTION OF THE EMBODIMENTS

Preferred embodiments of the present invention will be described below with reference to the drawings.

First Embodiment

Exterior Diagram of Digital Camera 100

Figure 1A:
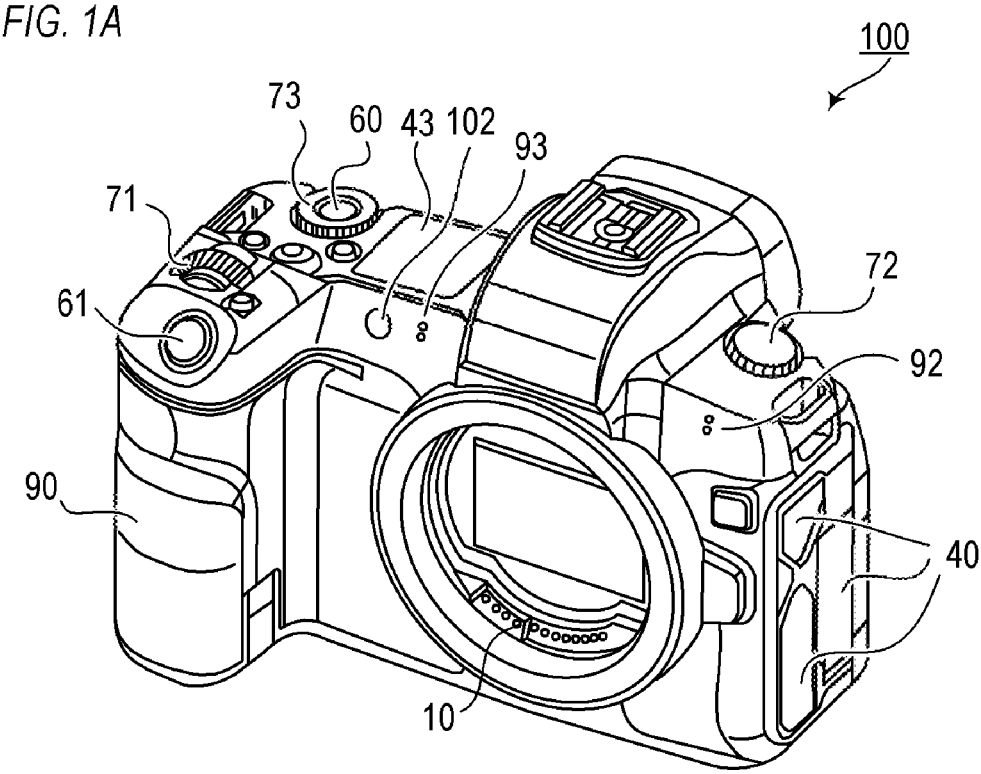
FIGS. 1A and 1B are a front perspective view and a rear perspective view of an imaging device, respectively.
Figure 1B:
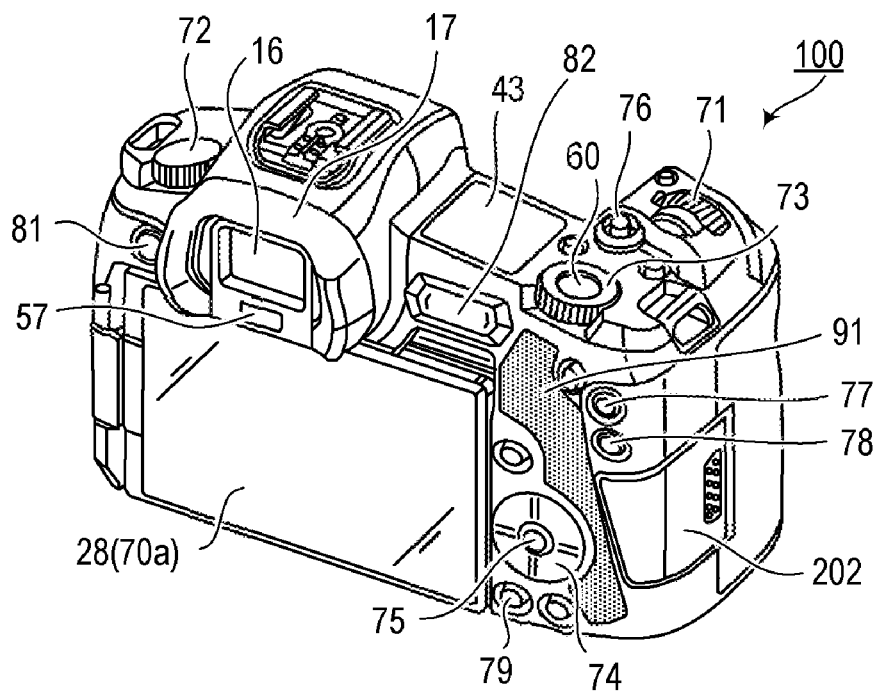

FIGS. 1A and 1B are diagrams illustrating an exterior of a digital camera 100 (imaging device) as an example of a device (electronic device) to which the present invention is applicable. FIG. 1A is a front perspective view of the digital camera 100, and FIG. 1B is a rear perspective view of the digital camera 100.

A display unit 28, which is a display unit provided on the back surface of the digital camera 100, displays images and various information. A touch panel 70a can detect a touch operation on a display surface (touch screen) of the display unit 28. A viewfinder outside display unit 43, which is a display unit provided on the upper surface of the digital camera 100, displays various setting values of the digital camera 100 such as a shutter speed and an aperture. A shutter button 61 is an operation member for giving an instruction to perform capturing. A mode switching switch 60 is an operation member for switching between various modes. A terminal cover 40 is a cover that protects a connector (not illustrated) with a connection cable or the like for connecting the digital camera 100 to an external device. Connectors such as an external microphone input terminal, an HDMI (registered trademark) output terminal, and a headphone terminal are provided where the terminal cover 40 is removed.

A main electronic dial 71 is a rotary operation member, and setting values such as a shutter speed and an aperture can be changed by turning the main electronic dial 71. A power switch 72 is an operation member for switching a power supply of the digital camera 100 between ON and OFF. A sub-electronic dial 73 is a rotary operation member, and movement of a selection frame (cursor), sending of an image, and the like can be performed by rotating the sub-electronic dial 73. A four-direction key 74 is configured such that up, down, left, and right portions can be pressed, and processing corresponding to a pressed portion of the four-direction key 74 can be performed. A SET button 75 is a press button and is mainly used for determination of a selection item, and the like.

A moving image button 76 is a physical press button used to give an instruction to start or stop moving image capturing (recording) and to start or stop live distribution. An AE lock button 77 is a press button, and an exposure state can be fixed by pressing the AE lock button 77 in a capturing standby state. An enlargement button 78 is an operation button for switching between ON and OFF of an enlargement mode in live-view display (LV display) in a capturing mode. It is possible to enlarge or reduce a live-view image (LV image) by operating the main electronic dial 71 after setting the enlargement mode to be in an ON state. In a reproduction mode, the enlargement button 78 functions as an operation button for enlarging a reproduced image and increasing an enlargement ratio. A reproduction button 79 is an operation button for switching between a capturing mode and a reproduction mode. By pressing the reproduction button 79 in the capturing mode, the mode is shifted to the reproduction mode, and a latest image among images recorded in a recording medium 200 (which will be described later) can be displayed on the display unit 28. A menu button 81 is a press button used to perform an instruction operation for displaying a menu screen, and the menu screen on which various settings can be made is displayed on the display unit 28 when the menu button 81 is pressed. A user can intuitively perform various settings using the menu screen displayed on the display unit 28, the four-direction key 74, and the SET button 75.

A touch bar 82 (multi-function bar: M-Fn bar) is a linear touch operation member (line touch sensor) capable of receiving a touch operation. The touch bar 82 is disposed at a position where a touch operation (touching) can be performed with a thumb of a right hand in a state where a grip portion 90 is gripped with the right hand so that the shutter button 61 can be pressed with an index finger of the right hand (with a little finger, a ring finger, and a middle finger of the right hand). That is, the touch bar 82 is disposed at an operable position in a state where the user's eye is in contact with an eyepiece portion 16 so that the user looks into a viewfinder and the shutter button 61 can be pressed at any time (capturing orientation). The touch bar 82 is a reception portion that can receive a tap operation (an operation of touching the touch bar and separating from the touch bar without moving within a predetermined period), a left/right sliding operation (an operation of touching the touch bar and then moving a touch position while touching the touch bar), and the like with respect to the touch bar 82. The touch bar 82 is an operation member different from a touch panel 70a and does not have a display function.

A communication terminal 10 is a communication terminal for the digital camera 100 to communicate with a lens unit 150 (which will be described later; detachable). The eyepiece portion 16 is an eyepiece portion of an eye approach viewfinder 17 (looking-in type viewfinder), and the user can visually recognize a video displayed on an internal electronic view finder (EVF) 29 through the eyepiece portion 16. An eye approach detection unit 57 is an eye approach detection sensor that detects whether the user's eye (photographer's eye) has come close to the eyepiece portion 16. A lid 202 is a lid for a slot that stores the recording medium 200 (which will be described later). The grip portion 90 is a holding portion having such a shape that the user can easily hold the digital camera 100 with his or her right hand when holding the digital camera 100. The shutter button 61 and the main electronic dial 71 are disposed at positions where they can be operated with the index finger of the right hand while holding the digital camera 100 by gripping the grip portion 90 with the little finger, the ring finger, and the middle finger of the right hand. In the same state, the sub-electronic dial 73 and the touch bar 82 are disposed at positions where they can be operated with the thumb of the right hand. A thumb rest portion 91 (thumb standby position) is a grip member provided at a position on the back side of the digital camera 100 where the thumb of the right hand holding the grip portion 90 can be easily placed without operating any operation member. The thumb rest portion 91 is constituted by a rubber member or the like for enhancing holding power (gripping feeling).

Configuration Block Diagram of Digital Camera 100

Figure 2:
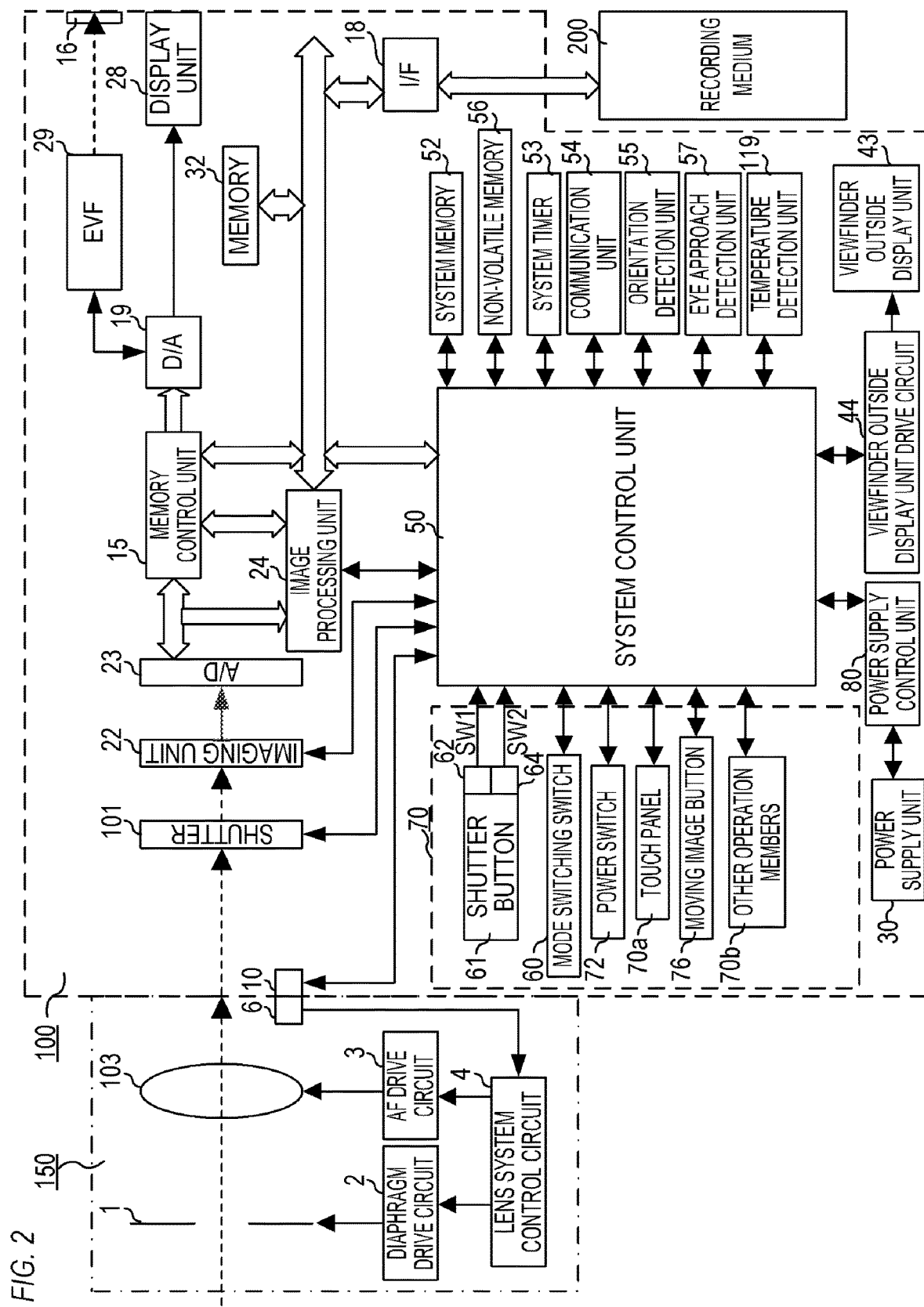
FIG. 2 is a block diagram illustrating a configuration of the imaging device.

FIG. 2 is a block diagram illustrating a configuration example of the digital camera 100. The lens unit 150 is a lens unit on which an interchangeable capturing lens is mounted. Although a lens 103 is normally constituted by a plurality of lenses, only one lens is illustrated in FIG. 2 for the sake of simplicity. A communication terminal 6 is a communication terminal for the lens unit 150 to communicate with the digital camera 100 side, and the communication terminal 10 is a communication terminal for the digital camera 100 to communicate with the lens unit 150 side. The lens unit 150 communicates with a system control unit 50 via these communication terminals 6 and 10. The lens unit 150 controls a diaphragm 1 through a diaphragm drive circuit 2 by a lens system control circuit 4 inside. The lens unit 150 performs focusing by displacing the position of the lens 103 via an AF drive circuit 3 by the lens system control circuit 4.

A shutter 101 is a focal plane shutter that can freely control an exposure time of an imaging unit 22 under the control of the system control unit 50.

The imaging unit 22 is an imaging element (image sensor) constituted by a CCD element, a CMOS device, or the like that converts an optical image into an electrical signal. The imaging unit 22 may include an imaging surface phase difference sensor that outputs defocus amount information to the system control unit 50. The A/D converter 23 converts an analog signal output from the imaging unit 22 into a digital signal.

An image processing unit 24 performs predetermined processing (resize processing such as pixel interpolation and reduction, color conversion processing, and the like) on data received from the A/D converter 23 or data received from a memory control unit 15. The image processing unit 24 performs predetermined arithmetic processing using captured image data, and the system control unit 50 performs exposure control and distance measurement control based on arithmetic results obtained by the image processing unit 24. Thereby, autofocus (AF) processing of a through-the-lens (TTL) system, automatic exposure (AE) processing, flash pre-emission (EF) processing, and the like are performed. The image processing unit 24 further performs predetermined arithmetic processing using captured image data, and performs auto white balance (AWB) processing of a TTL system based on obtained arithmetic results.

The digital camera 100 is provided with an audio input unit (not illustrated) that acquires an audio signal from a built-in microphone 93 or an external microphone connected thereto via an external microphone input terminal. The system control unit 50 selects an input audio signal as necessary, performs analog-to-digital conversion, and performs level optimization processing, specific frequency reduction processing, and the like to generate audio data.

Data output from the A/D converter 23 is written in a memory 32 via the image processing unit 24 and the memory control unit 15. Alternatively, the data output from the A/D converter 23 is written in the memory 32 via the memory control unit 15 without passing through the image processing unit 24. The memory 32 stores image data obtained by the imaging unit 22 and converted into digital data by the A/D converter 23, image data to be displayed on the display unit 28 and the EVF 29, and audio data. The memory 32 has a storage capacity sufficient to store a predetermined number of still images, moving images for a predetermined period of time, and audio.

The memory 32 also serves as an image display memory (video memory). A D/A converter 19 converts image display data stored in the memory 32 into an analog signal and supplies the analog signal to the display unit 28 and the EVF 29. In this manner, the image display data written in the memory 32 is displayed on the display unit 28 or the EVF 29 via the D/A converter 19. Each of the display unit 28 and the EVF 29 is a display such as an LCD or organic EL, and performs display according to analog signals received from the D/A converter 19. Digital signals that are A/D converted by the A/D converter 23 and stored in the memory 32 are converted into analog signals by the D/A converter 19, sequentially transferred to the display unit 28 or the EVF 29, and displayed, whereby live view display (LV) can be performed. An image displayed through the live-view display will be referred to as a live-view image (LV image) below.

The system control unit 50 is a control unit including at least one processor and/or at least one circuit, and controls the digital camera 100 as a whole. The system control unit 50 is both a processor and a circuit. The system control unit 50 executes a program recorded in a non-volatile memory 56 to implement each processing of the present embodiment to be described later. The system control unit 50 also performs display control by controlling the memory 32, the D/A converter 19, the display unit 28, the EVF 29, and the like. The system control unit 50 also performs moving image encoding based on video data obtained from the imaging unit 22 and audio data obtained from the audio input unit and performs processing for generating a moving image file in a predetermined format.

A system memory 52 is, for example, a RAM. The system control unit 50 expands constants and variables for operation of the system control unit 50, programs read from the non-volatile memory 56, and the like into the system memory 52.

The non-volatile memory 56 is an electrically erasable/recordable memory such as an EEPROM. Constants for the operation of the system control unit 50, programs, and the like are recorded in the non-volatile memory 56. The programs as mentioned here are programs for executing various flowcharts to be described later in the present embodiment.

A system timer 53 is a clocking unit that measures a time used for a variety of control and the time of a built-in clock.

A communication unit 54 transmits and receives video signals and audio signals to and from an external device connected in a wireless manner or by a wired cable. The communication unit 54 can also be connected to a wireless local area network (LAN) and the Internet. The communication unit 54 can also communicate with an external device using Bluetooth (registered trademark) or Bluetooth Low Energy. The communication unit 54 can transmit images (including LV images) captured by the imaging unit 22 and images recorded in the recording medium 200, and can receives various information such as image data and a moving image recording start instruction from an external device. When the moving image recording start instruction is received from the external device, a user can be notified of the instruction by lighting a light emitting portion 102 or generating an electronic audio from a speaker 92.

An orientation detection unit 55 detects the orientation of the digital camera 100 in a direction of gravity. Based on the orientation detected by the orientation detection unit 55, it is possible to determine whether an image captured by the imaging unit 22 is an image captured with the digital camera 100 held horizontally or an image captured with the digital camera 100 held vertically. The system control unit 50 can add direction information corresponding to the orientation detected by the orientation detection unit 55 to an image file of an image captured by the imaging unit 22, or can rotate and record the image. An acceleration sensor, a gyro sensor, or the like can be used as the orientation detection unit 55. It is also possible to detect the movement of the digital camera 100 (panning, tilting, lifting, being stationary, or the like) using an acceleration sensor or the gyro sensor, which is the orientation detection unit 55.

The eye approach detection unit 57 is an eye approach detection sensor that detects approach (eye approach) and separation (eye separation) of an eye (object) from the eyepiece portion 16 of the eye approach viewfinder 17 (hereinafter simply referred to as a "viewfinder") (approach detection). The system control unit 50 switches between display (display state) and non-display (non-display state) of the display unit 28 and the EVF 29 in accordance with the state detected by the eye approach detection unit 57. More specifically, at least in a capturing standby state and when a switching setting of a display destination is automatic switching, a display destination is set to be the display unit 28 of which the display state is set to be an ON state, and the EVF 29 is set to be in a non-display state during non-eye approach. During eye approach, a display destination is set to be the EVF 29 of which the display state is set to be an ON state, and the display unit 28 is set to be in a non-display state. For example, an infrared proximity sensor can be used as the eye approach detection unit 57, and the eye approach detection unit 57 can detect an approach of any object to the eyepiece portion 16 of the viewfinder 17 having the EVF 29 built-in. When an object approaches, infrared light projected from a light projecting unit (not illustrated) of the eye approach detection unit 57 is reflected by the object and received by a light receiving unit (not illustrated) of the infrared proximity sensor. It is also possible to determine how close the object is from the eyepiece portion 16 (eye approach distance) based on the amount of infrared light received. In this manner, the eye approach detection unit 57 performs eye approach detection for detecting a proximity distance of the object to the eyepiece portion 16. When an object approaching the eyepiece portion 16 within a predetermined distance is detected from a non-eye approach state (non-approach state), it is assumed that the approach of the eye has been detected. When the object of which the approached has been detected is separated by a predetermined distance or more from an eye approach state (approach state), it is assumed that the separation of the eye has been detected. A threshold value for detecting eye approach and a threshold value for detecting eye separation may be different, for example, by providing hysteresis. After the eye approach is detected, it is assumed that an eye approach state is set until eye separation is detected. After eye separation is detected, it is assumed that a non-eye approach state is set until eye approach is detected. The infrared proximity sensor is merely an example, and other sensors may be adopted as the eye approach detection unit 57 as long as they can detect a state that can be regarded as eye approach.

A temperature detection unit 119 detects the temperature of the digital camera 100. At this time, a plurality of thermometers may be used, and there is no limit to heat measurement points.

Various setting values of the camera, such as a shutter speed and an aperture, are displayed on the viewfinder outside display unit 43 via a viewfinder outside display unit drive circuit 44.

A power supply control unit 80 is constituted by a battery detection circuit, a DC-DC converter, a switch circuit for switching blocks to be electrified, and the like, and detects whether a battery has been mounted, the type of a battery, and a remaining battery amount. The power supply control unit 80 controls a DC-DC converter based on the detection results and an instruction given by the system control unit 50, and supplies a necessary voltage to each portion including the recording medium 200 for a necessary period. A power supply unit 30 includes a primary battery such as an alkaline battery or a lithium battery, a secondary battery such as a NiCd battery, a NiMH battery, or a Li battery, an AC adapter, or the like.

A recording medium OF 18 is an interface with the recording medium 200 such as a memory card or a hard disk. The recording medium 200 is a recording medium such as a memory card for recording captured images, and is constituted by a semiconductor memory, a magnetic disk, or the like.

An operation unit 70 is an input unit that receives an operation from a user (user operation), and is used to input various operation instructions to the system control unit 50. As illustrated in FIG. 2, the operation unit 70 includes the shutter button 61, the mode switching switch 60, the power switch 72, the touch panel 70a, the moving image button 76, other operation members 70b, and the like. Other operation members 70b include the main electronic dial 71, the sub-electronic dial 73, the four-direction key 74, the SET button 75, the AE lock button 77, the enlargement button 78, the reproduction button 79, the menu button 81, the touch bar 82, and the like.

The shutter button 61 includes a first shutter switch 62 and a second shutter switch 64. When the shutter button 61 is being operated, that is, when the shutter button 61 is half-pressed (capturing preparation instruction), the first shutter switch 62 is turned on to generate a first shutter switch signal SW1. The system control unit 50 starts capturing preparation operations such as AF (autofocus) processing, AE (auto exposure) processing, AWB (auto white balance) processing, and EF (flash pre-emission) processing in response to the first shutter switch signal SW1.

When the operation of the shutter button 61 is completed, that is, when the shutter button 61 is fully pressed (capturing instruction), the second shutter switch 64 is turned on to generate a second shutter switch signal SW2. In response to the second shutter switch signal SW2, the system control unit 50 starts a series of capturing processing from reading of a signal from the imaging unit 22 to writing of a captured image to the recording medium 200 as an image file.

The mode switching switch 60 switches an operation mode of the system control unit 50 to any one of a still image capture mode, a moving image capturing mode, a reproduction mode, and the like. Modes included in the still image capture mode include an auto capturing mode, an auto scene discrimination mode, a manual mode, an aperture priority mode (Av mode), a shutter speed priority mode (Tv mode), and a program AE mode (P mode). The modes included in the still image capture mode also include various scene modes which are capturing settings for respective capturing scenes, a custom mode, and the like. The mode switching switch 60 allows a user to directly switch the mode to any one of these modes. Alternatively, the user may once perform switching to a capturing mode list screen with the mode switching switch 60 and then selectively switch the mode to any one of a plurality of modes displayed by using another operation member. Similarly, the moving image capturing mode may also include a plurality of modes.

The touch panel 70a is a touch sensor that detects various touch operations on the display surface of the display unit 28 (an operation surface of the touch panel 70a). The touch panel 70a and the display unit 28 can be configured integrally. For example, the touch panel 70a is configured such that the light transmittance does not interfere with the display of the display unit 28, and is attached to the upper layer of the display surface of the display unit 28. Input coordinates in the touch panel 70a and display coordinates on the display surface of the display unit 28 are associated with each other. Thereby, it is possible to provide a graphical user interface (GUI) as if the user could directly operate a screen displayed on the display unit 28. The display unit 28 including the touch panel 70a is referred to as a touch panel display, and a touch-operable screen provided by the touch panel display is referred to as a touch screen.

The system control unit 50 can detect the following operations or states for the touch panel 70a.

A new touch on the touch panel 70a by a finger or a pen that has not touched the touch panel 70a, that is, the start of a touch (hereinafter referred to as a touch-down)
  A state where the touch panel 70a is touched by a finger or a pen (hereinafter referred to as a touch-on)
  Movement of a finger or a pen while touching the touch panel 70a (hereinafter referred to as a touch-move)
  Separation (release) of a finger or a pen that has touched the touch panel 70a from the touch panel 70a, that is, the end of a touch (hereinafter referred to as a touch-up)
  A state where nothing has touched the touch panel 70a (hereinafter referred to as a touch-off)

When a touch-down is detected, a touch-on is also detected at the same time. After the touch-down, a touch-on is continuously detected normally unless a touch-up is detected. A touch-on is detected at the same time also when a touch-move is detected. Even when a touch-on is detected, a touch-move is not detected when a touch position is not moved. After a touch-up of each of all the fingers and pens that have touched the touch panel 70a has been detected, a touch-off is performed.

The system control unit 50 is notified of these operations and states and the coordinates of the position where the finger or pen touches the touch panel 70a through an internal bus. Based on notification information, the system control unit 50 determines what kind of operation (touch operation) has been performed on the touch panel 70a. A touch-move can be determined for each vertical component/horizontal component on the touch panel 70a based on a change in positional coordinates in a moving direction of the finger or pen moving on the touch panel 70a. When a touch-move corresponding to a predetermined distance or more has been detected, it is determined that a slide operation has been performed. An operation in which a finger is rapidly moved by a certain degree of distance while touching the touch panel 70a and then released is referred to as a flick. In other words, the flick is an operation of rapidly tracing the touch panel 70a with a finger, such as flicking. It can be determined that a flick has been performed when a touch-move performed at a predetermined distance or more and a predetermined speed or more is detected, and a touch-up is detected as it is (it can be determined that a flick has occurred following a slide operation). Further, a touch operation of touching (multi-touching) a plurality of points (for example, two points) and bringing the touch positions closer to each other is referred to as a pinch-in, and a touch operation of moving the touch positions away from each other is referred to as a pinch-out. The pinch-out and the pinch-in are collectively referred to as a pinch operation (or simply a pinch). A touch operation of successively performing tapping rapidly within a predetermined time is referred to as double-tapping, and a touch operation of continuing a touch-on for a predetermined time or longer and then performing a touch-up is referred to as long-tapping (so-called long-pressing). The touch panel 70a may be of any of various types of touch panels such as a resistive film type, a capacitive type, a surface acoustic wave type, an infrared type, an electromagnetic induction type, an image recognition type, and an optical sensor type. There is a method of detecting that a touch has been performed when a contact with a touch panel has been made, and a method of detecting that a touch has been performed when there is an approach of a finger or a pen to a touch panel, and any of the methods may be used.

Main Processing

Figure 3:
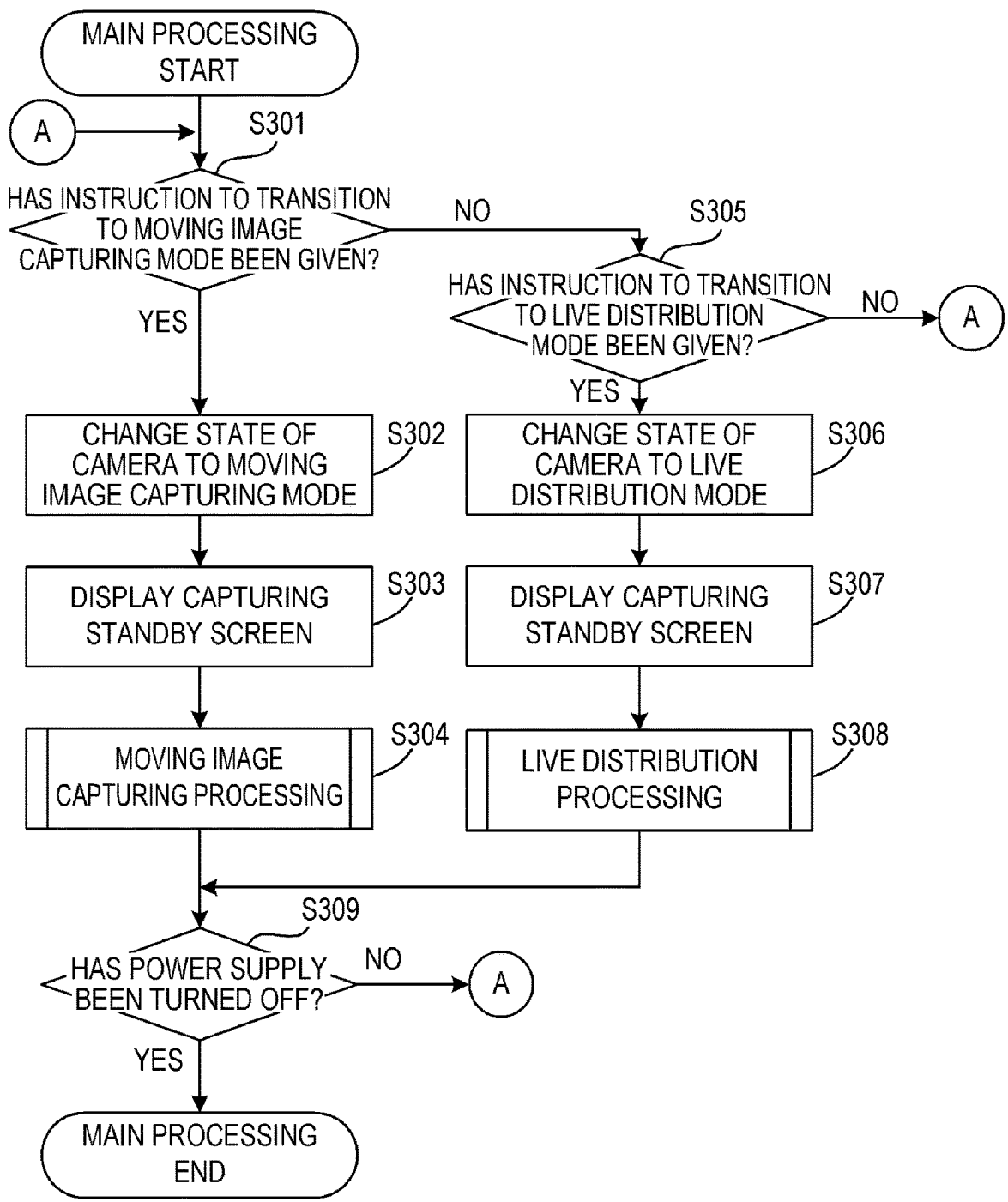
FIG. 3 is a flowchart of main processing.

FIG. 3 is a flowchart showing main processing including a mode transition. When a user operates the power switch 72 to turn on the power of the digital camera 100, the system control unit 50 expands a program stored in the non-volatile memory 56 into the system memory 52 and executes the program, whereby each processing illustrated in FIG. 3 is implemented.

In S301, the system control unit 50 determines whether a user has given an instruction to transition to a moving image capturing mode based on a signal received from the mode switching switch 60. When the system control unit 50 determines that the user has given an instruction to transition to the moving image capturing mode, the system control unit 50 causes the processing to proceed to S302. Otherwise, the system control unit 50 causes the processing to proceed to S305.

Figure 6A:
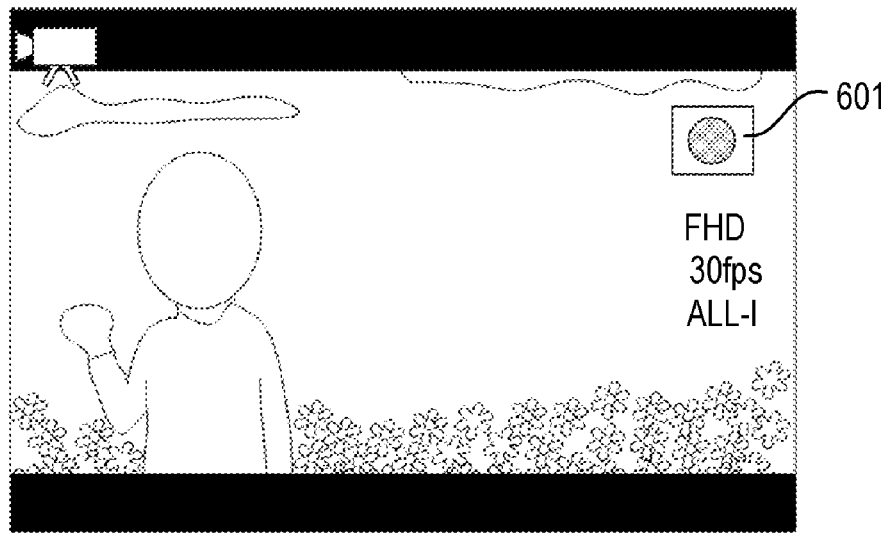
FIGS. 6A and 6B are examples of capturing standby screens in a moving image capturing mode and a live distribution mode, respectively.

In S302, the system control unit 50 changes the state of the camera to the moving image capturing mode. In S303, the system control unit 50 displays a capturing standby screen in the moving image capturing mode on the display unit 28. FIG. 6A is an example of a capturing standby screen in a moving image capturing mode displayed on the display unit 28 in the present embodiment. A capturing start touch button 601 is displayed on the capturing standby screen. In S304, the system control unit 50 executes moving image capturing processing. Details of the moving image capturing processing will be described later with reference to FIG. 4. When the moving image capturing processing ends, the system control unit 50 causes the processing to proceed to S309.

In S305, the system control unit 50 determines whether the user has given an instruction to transition to a live distribution mode based on a signal received from the mode switching switch 60. When the system control unit 50 determines that the user has given an instruction to transition to the live distribution mode, the system control unit 50 causes the processing to proceed to S306. Otherwise, the system control unit 50 returns the processing to the beginning of the main processing (S301). The live distribution mode is a mode in which captured image data (moving image data) is distributed to an external device without delay so that a third party can view a video and audio during capturing substantially in real time.

Figure 5:
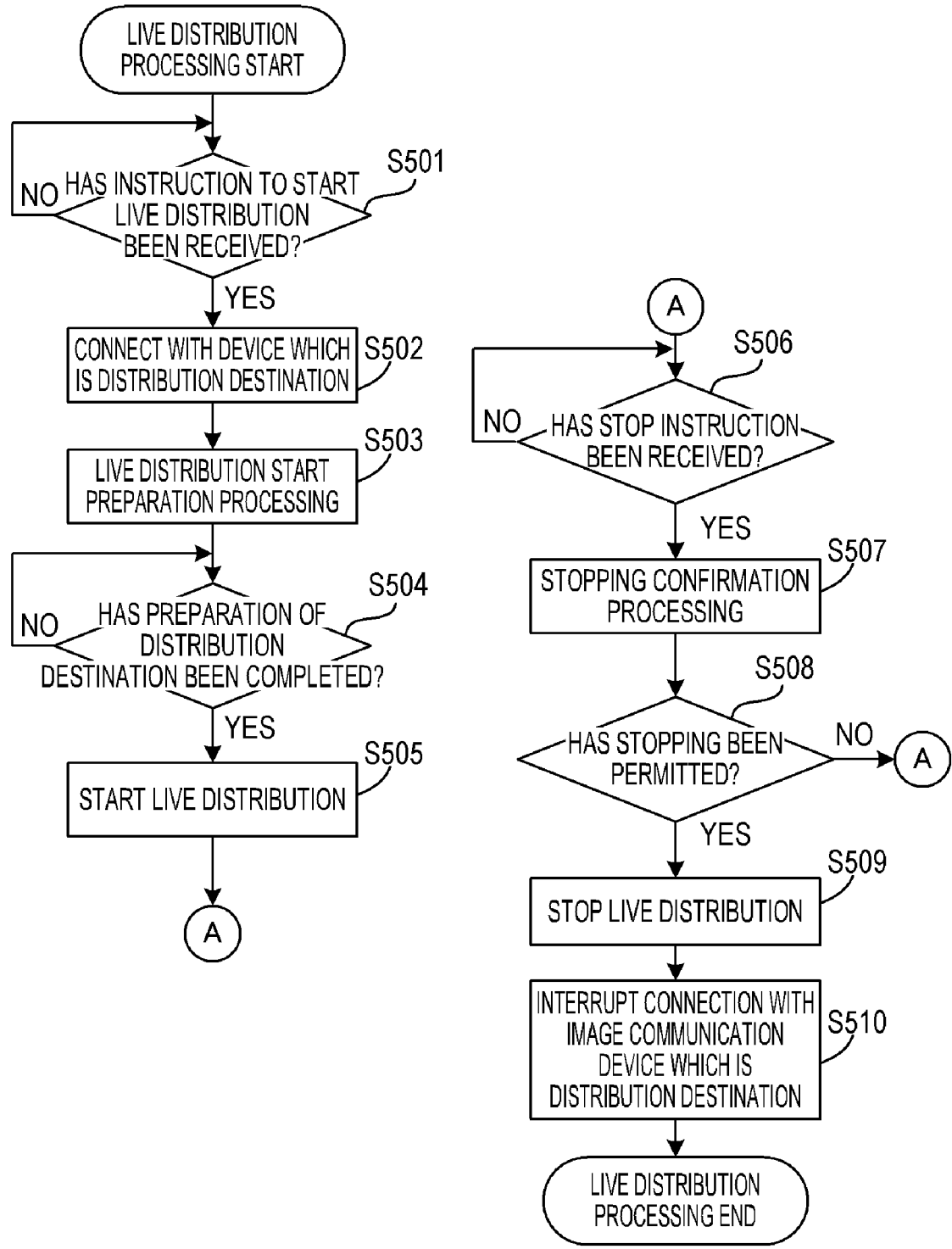
FIG. 5 is a flowchart of control of a live distribution mode in a first embodiment.
Figure 6B:
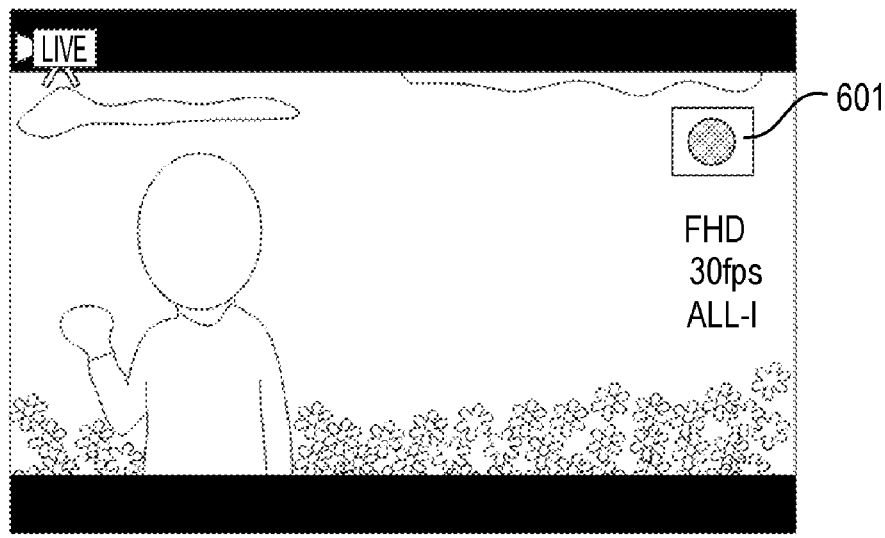

In S306, the system control unit 50 changes the state of the camera to a live distribution mode. In S307, the system control unit 50 displays a capturing standby screen in the live distribution mode on the display unit 28. FIG. 6B is an example of a capturing standby screen in a live distribution mode displayed on the display unit 28 in the present embodiment. The capturing start touch button 601 is displayed on the capturing standby screen. In S308, the system control unit 50 executes live distribution processing. Details of the live distribution processing will be described later with reference to FIG. 5. When the live distribution processing ends, the system control unit 50 causes the processing to proceed to S309.

In S309, the system control unit 50 determines whether the user has turned off the power switch 72. When the system control unit 50 determines that the digital camera 100 has been turned off, the system control unit 50 ends the main processing. When the system control unit 50 determines that the digital camera 100 has not been turned off, the system control unit 50 returns the processing to the beginning of the main processing (S301).

Moving Image Capturing Processing

Figure 4:
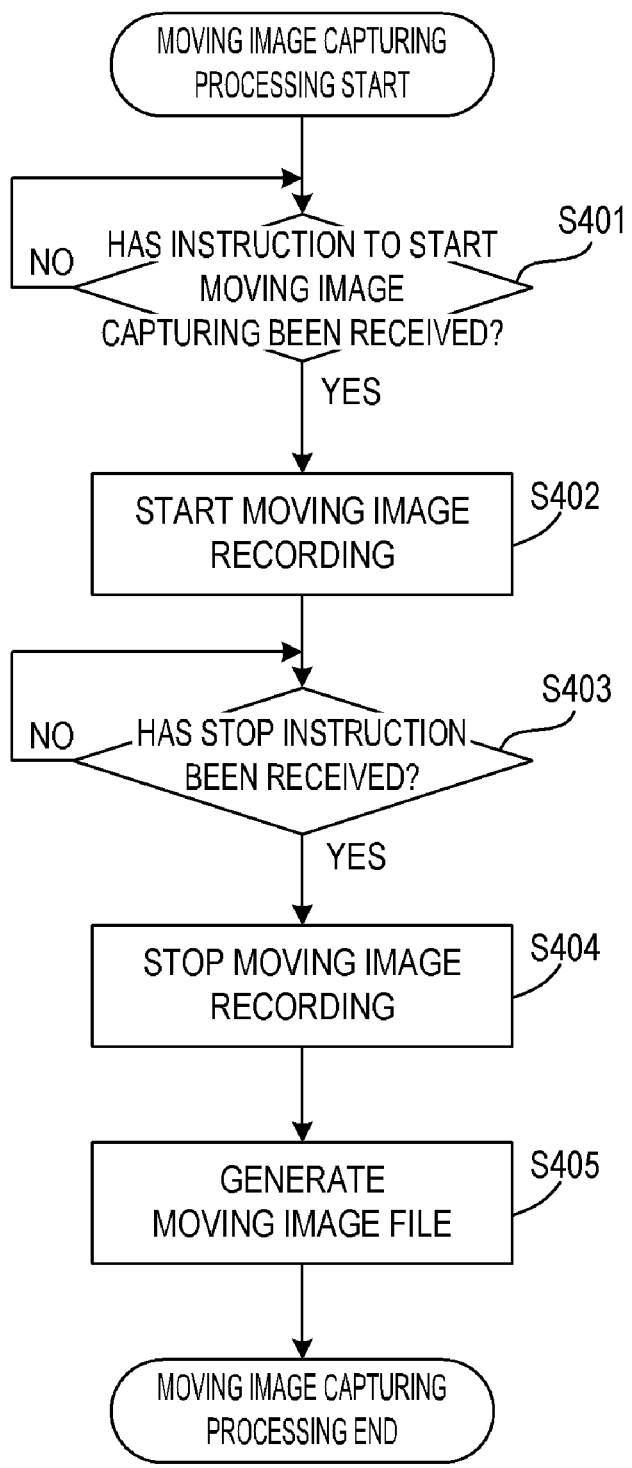
FIG. 4 is a flowchart of control of a moving image capturing mode.

The operation of the moving image capturing processing in S304 will be described below with reference to FIG. 4. FIG. 4 is a flowchart showing an example of control of the moving image capturing mode executed by the system control unit 50.

In S401, the system control unit 50 determines whether an instruction to start moving image capturing has been received from the user (whether a user operation of giving an instruction to start moving image capturing has been performed). When the system control unit 50 determines that an instruction to start moving image capturing has been received, the system control unit 50 causes the processing to proceed to step S402. Otherwise, the system control unit 50 repeats the determination of S401. That is, the system control unit 50 waits until an instruction to start moving image capturing is received. The user operation of giving an instruction to start moving image capturing may be either pressing the moving image button 76 which is a physical button, or touching the capturing start touch button 601 which is a virtual button displayed on the touch screen.

Figure 7A:
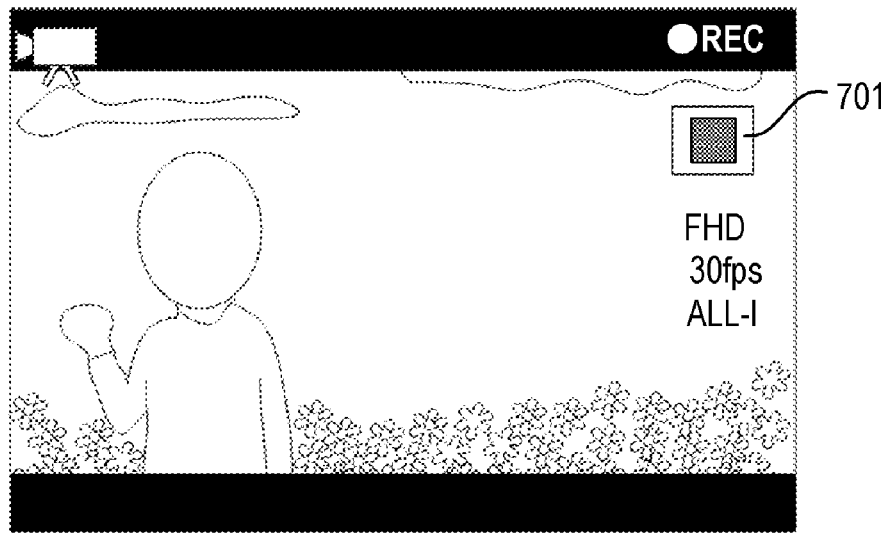
FIGS. 7A and 7B are examples of screens during capturing in the moving image capturing mode and the live distribution mode, respectively.

In S402, the system control unit 50 starts recording a moving image. Specifically, the system control unit 50 starts capturing video data from the imaging unit 22 and capturing audio data from the audio input unit. The video data and the audio data are temporarily stored in the memory 32 or the recording medium 200. In the middle of moving image recording processing, the screen display on the display unit 28 changes so that the user can recognize that the moving image is being recorded. FIG. 7A is an example of a screen during moving image recording. In this example, an icon of " " indicating that the moving image is being recorded and characters "REC" are displayed on the upper right side of the screen, and a button on the touch screen is replaced with a capturing stopping touch button 701.

In S403, the system control unit 50 determines whether an instruction to stop moving image capturing has been received from the user (whether a user operation of giving an instruction to stop moving image capturing has been performed). When the system control unit 50 determines that an instruction to stop moving image capturing has been received, the system control unit 50 causes the processing to proceed to step S404. Otherwise, the system control unit 50 repeats the determination of S403. That is, capturing and recording of a moving image are continued until the system control unit 50 receives an instruction to stop moving image capturing. The user operation of giving an instruction to stop moving image capturing may be either pressing the moving image button 76 which is a physical button or touching the capturing stopping touch button 701 which is a virtual button.

In S404, the system control unit 50 stops recording a moving image. Specifically, the system control unit 50 stops capturing video data from the imaging unit 22 and capturing audio data from the audio input unit.

In S405, the system control unit 50 performs moving image encoding processing on video data and audio data temporarily stored in the memory 32 or the recording medium 200 to generate a moving image file in a desired format. The moving image file is written in the recording medium 200 non-temporarily.

As described above, the moving image capturing processing ends. When an abnormal operation such as changing the mode by the mode switching switch 60 is performed during moving image capturing, the flow may be interrupted in the middle.

Live Distribution Processing

An operation of the live distribution processing in S308 will be described below with reference to FIG. 5. FIG. 5 is a flowchart showing an example of control of the live distribution mode executed by the system control unit 50 in the first embodiment.

In S501, the system control unit 50 determines whether an instruction to start live distribution has been received from the user (whether a user operation of giving an instruction to start live distribution has been performed). When it is determined that an instruction to start live distribution has been received, the system control unit 50 causes the processing to proceed to S502. Otherwise, the system control unit 50 repeats the determination of S501. That is, the system control unit 50 waits until an instruction to start live distribution is received. The user operation of giving an instruction to start live distribution may be either pressing the moving image button 76 which is a physical button, or touching the capturing start touch button 601 which is a virtual button displayed on the touch screen.

In S502, the system control unit 50 connects with an external device which is a distribution destination (hereinafter, an external device which is a distribution destination will be referred to as an "image communication device") by using a wireless LAN function of the communication unit 54. The image communication device may be a device having at least a communication function, an image processing function, and a display function, and for example, a personal computer, a smartphone, a tablet terminal, a game machine, a smart watch, smart glasses, or the like can be used. Alternatively, the image communication device may be a server that mediates image distribution. In S503, the system control unit 50 performs live distribution start preparation processing such as a live distribution start preparation request for the image communication device.

In S504, the system control unit 50 receives state information from the image communication device, and determines whether live distribution start preparation of the image communication device has been completed based on the state information. When the system control unit 50 determines that the live distribution start preparation of the image communication device has been completed, the system control unit 50 causes the processing to proceed to step S505. When it is determined that the live distribution start preparation of the image communication device has not been completed, the system control unit 50 repeats the determination of S504. That is, the system control unit 50 waits until the preparation of the image communication device is completed.

Figure 7B:
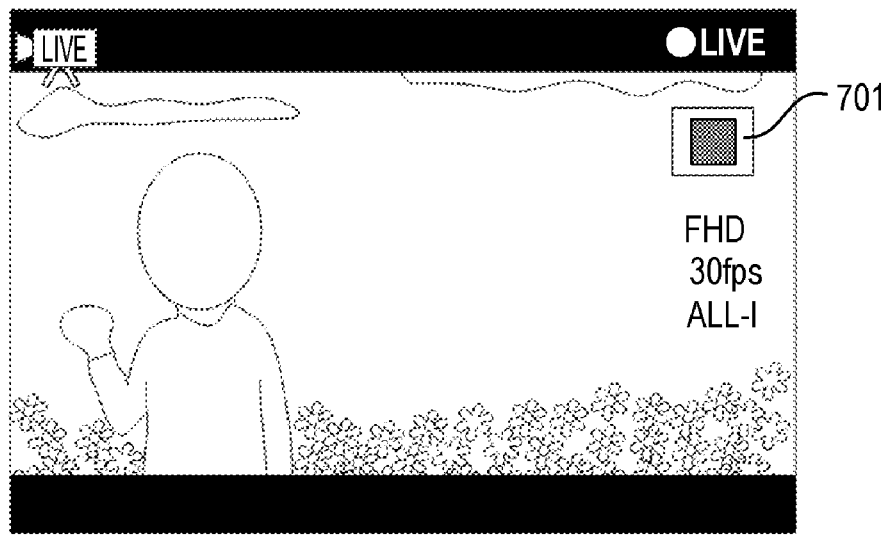

In S505, the system control unit 50 starts live distribution processing. When the live distribution processing is started, video data is captured from the imaging unit 22 and corresponding audio data is captured from the audio input unit at a predetermined cycle, and moving image data for distribution is encoded from the video data and the audio data. The moving image data is transmitted to the image communication device via the communication unit 54. Thereby, a moving image captured by the digital camera 100 can be distributed to a third party substantially in real time and viewed by the third party. In the middle of the live distribution processing, the screen display on the display unit 28 changes so that the user can recognize that the live distribution is being performed. FIG. 7B is an example of a screen during live distribution. In this example, characters "LIVE" indicating that live distribution is being performed are displayed on a video camera icon on the upper left side of the screen, and a button on the touch screen is replaced with the capturing stopping touch button 701. An icon of "." and characters of "LIVE" are displayed on the upper right side of the screen.

In S506, the system control unit 50 determines whether a stop instruction has been received from the user (whether a user operation of giving an instruction to stop moving image capturing for live distribution has been performed). When the system control unit 50 determines that the stop instruction has been received, the system control unit 50 causes the processing to proceed to S507. Otherwise, the system control unit 50 repeats the determination of S506. The operation of giving an instruction to stop live distribution (to stop moving image capturing) may be either pressing the moving image button 76 which is a physical button or touching the capturing stopping touch button 701 which is a virtual button.

In S507, the system control unit 50 executes stopping confirmation processing for reconfirming with the user whether the live distribution may be stopped. In the present embodiment, the system control unit 50 confirms the intention of the user by displaying a live distribution stop guide 801 illustrated in FIG. 8 on the display unit 28. A specific method of the stopping confirmation processing is not limited to this example. In addition to the method of displaying a guide (confirmation screen) on the display unit 28, a confirmation method using audio, or the like can also be used.

In S508, the system control unit 50 determines whether the user has permitted the stopping of the live distribution. For example, when the user presses (touches) an "OK" button of the live distribution stop guide 801 in FIG. 8, the system control unit 50 determines that the stopping has been permitted, and the system control unit 50 causes the processing to proceed to S509. When the stopping has not been permitted, the system control unit 50 regards the stop instruction received in S506 as an erroneous operation and continues the live distribution.

In S509, the system control unit 50 stops the live distribution. Specifically, the system control unit 50 performs stop processing such as stopping moving image capturing (capturing of video data from the imaging unit 22 and capturing of audio data from the audio input unit) and stopping live distribution of moving image data to the image communication device. In S510, the system control unit 50 interrupts the connection with the image communication device which is a distribution destination.

As described above, the live distribution processing ends. When an abnormal operation such as changing the mode by the mode switching switch 60 is performed during live distribution, the flow may be interrupted in the middle.

Advantages of the Present Embodiment

In a live distribution mode, even when a stop instruction is received in the middle of live distribution, the live distribution is not stopped immediately, and stopping confirmation processing of reconfirming with the user whether to stop the live distribution before stopping moving image capturing and live distribution is performed. Thus, it is possible to prevent unintended interruption of live distribution due to an erroneous operation as far as possible and to prevent a situation in which live video viewers are troubled.

On the other hand, when a stop instruction is received in a moving image capturing mode, moving image capturing is immediately stopped without executing stopping confirmation processing for the user. Even when an unintended interruption due to an erroneous operation occurs during moving image capturing, an impact is small because recovery is possible by re-capturing or editing. Thus, in the moving image capturing mode, control is performed with priority given to good responsiveness and immediacy with respect to the user's operation.

In the present embodiment, by adopting stopping control according to a mode as described above, it is possible to provide an imaging device that has both a moving image capturing function with excellent operability and a live distribution function that is excellent in preventing erroneous operations.

The stopping control in the present embodiment can be preferably applied to an imaging device having a user interface that allows an input of a stop instruction by touching a virtual button displayed on the touch screen. This is because, in such an imaging device, an erroneous operation is likely to occur due to unintended touching of the touch screen with a part of the body or the like. Thus, a device such as a smartphone and a tablet terminal in which a touch operation on a touch screen is mainly used can be said to be one of objects to which the stopping control in the present embodiment can be preferably applied.

Second Embodiment

In the first embodiment, stopping confirmation processing is always executed in a live distribution mode, but some users place more importance on good operability and responsiveness than on preventing erroneous operations even during live distribution. Consequently, in a second embodiment, a configuration in which a user can set (change) the necessity of stopping confirmation is adopted. Hereinafter, description overlapping the above-described embodiment will be omitted, and a configuration characteristic of the present embodiment will be mainly described.

Figure 9:
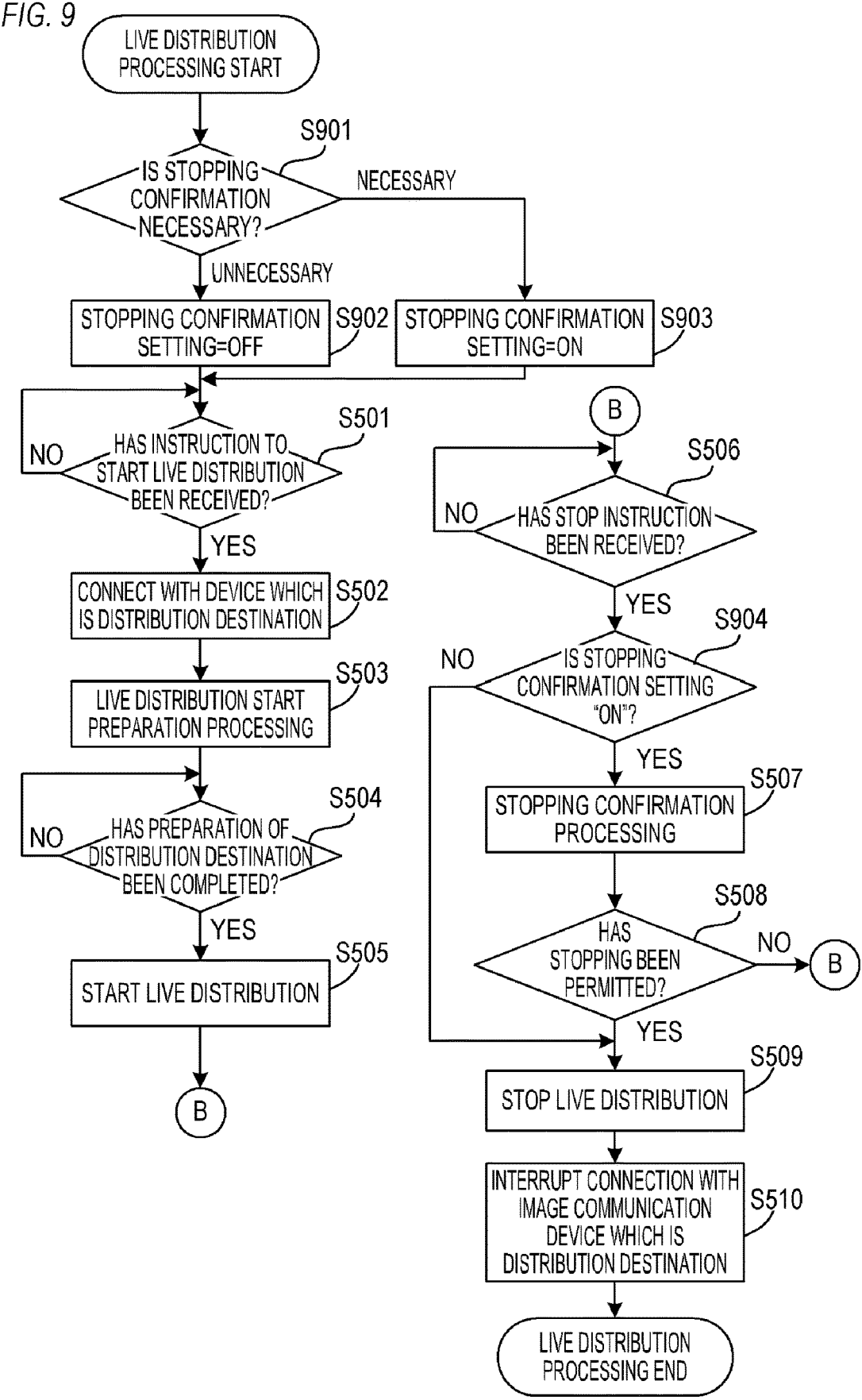
FIG. 9 is a flowchart of control of a live distribution mode in a second embodiment.

FIG. 9 is a flowchart showing an example of control of a live distribution mode executed by a system control unit 50 in the second embodiment. In the flowchart of FIG. 9, the same step numbers as those in the flowchart of FIG. 5 are attached to the same processing as in the first embodiment.

Figure 8:
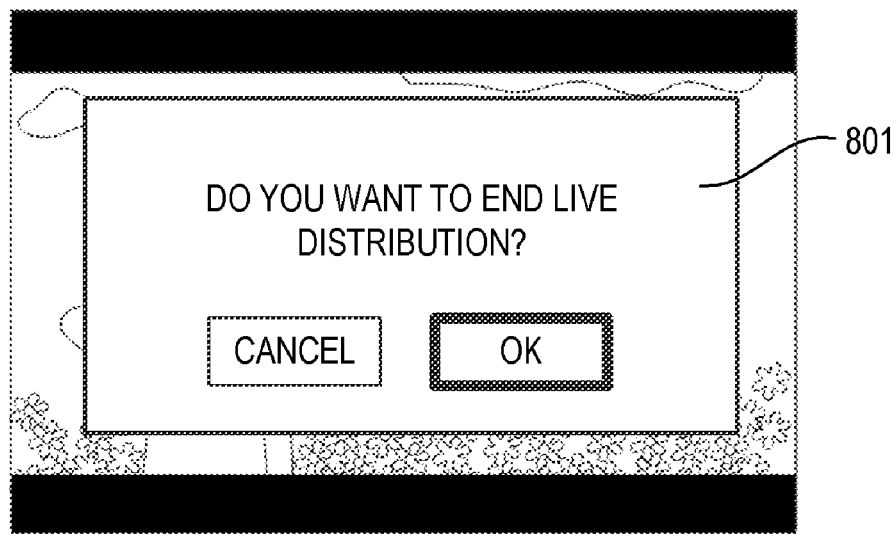
FIG. 8 is an example of a confirmation screen when an instruction to stop live distribution is received.

In S901, the system control unit 50 confirms with the user whether stopping confirmation is necessary. For example, the system control unit 50 may display a confirmation screen such as "Do you want to display a live distribution stop guide when a stop operation is performed?" on a display unit 28 to cause the user to reply whether stopping confirmation is necessary. When a reply of "unnecessary" is received from the user, the system control unit 50 causes the processing to proceed to S902. In S902, the system control unit 50 stores a setting value of "stopping confirmation setting: OFF" in a memory 32. When a reply of "necessary" is received from the user, the system control unit 50 causes the processing to proceed to S903. In S903, the system control unit 50 stores a setting value of "stopping confirmation setting: ON" in the memory 32. When the stopping confirmation setting is ON, a live distribution stop guide 801 as illustrated in FIG. 8 is displayed on the display unit 28 when a stop instruction is received in a live distribution mode.

Although setting values are saved in the memory 32 in the present embodiment, the setting values may be saved in a system memory 52 or a non-volatile memory 56. Alternatively, when setting values set by the user are registered in advance in the non-volatile memory 56 or the like, the system control unit 50 may read the setting values registered in advance without performing the processing of S901 to S903.

The processing from S501 to S506 is basically the same as the processing in the first embodiment. However, when the system control unit 50 determines in S506 that a stop instruction has been received from the user, the system control unit 50 causes the processing to proceed to S904.

In S904, the system control unit 50 determines whether a setting value is "ON" or "OFF" with reference to "stopping confirmation setting" in the memory 32. When the stopping confirmation setting is "ON", the system control unit 50 causes the processing to proceed to S507 and executes the stopping confirmation processing. Then, the system control unit 50 performs control of stopping live distribution (S509) when the user permits the stopping of the live distribution (YES in S508), and the system control unit 50 continues the live distribution when the stopping is rejected (NO in S508). On the other hand, when the stopping confirmation setting is "OFF", the system control unit 50 performs control of immediately stopping moving image capturing and live distribution without executing the stopping confirmation processing (S509). The processing from S507 to S510 is basically the same as the processing in the first embodiment.

According to the configuration of the present embodiment described above, it is possible to achieve the same operations and effects as those in the first embodiment. In the present embodiment, the user can set whether stopping confirmation is necessary in a live distribution mode, and thus the user himself/herself can select which of operability or prevention of an erroneous operation is given priority in accordance with preference and application. Thus, it is possible to provide a high-value-added imaging device with excellent usability.

Third Embodiment

In the first embodiment, moving image data captured in a live distribution mode is used only for live distribution. On the other hand, an imaging device according to a third embodiment provides a function of simultaneously saving moving images to be live-distributed in a moving image file. Hereinafter, description overlapping the above-described embodiment will be omitted, and a configuration characteristic of the present embodiment will be mainly described.

Figure 10:
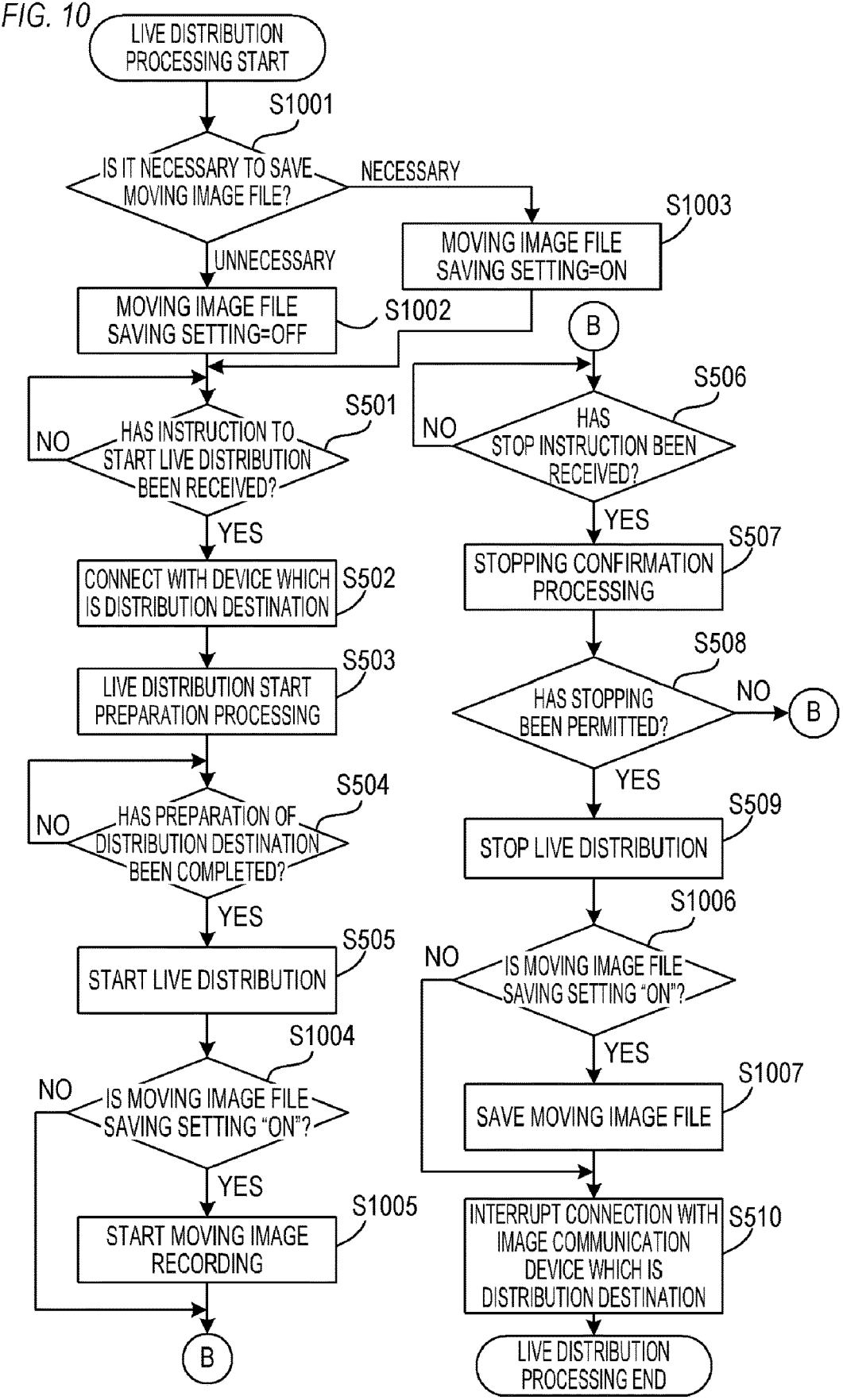
FIG. 10 is a flowchart of control of a live distribution mode in a third embodiment.

FIG. 10 is a flowchart showing an example of control of a live distribution mode executed by a system control unit 50 in the third embodiment. In the flowchart of FIG. 10, the same step numbers as those in the flowchart of FIG. 5 are attached to the same processing as in the first embodiment.

In S1001, the system control unit 50 confirms with a user whether it is necessary to save a moving image file. For example, the system control unit 50 may display a confirmation screen such as "Do you want to save a live video in a file?" on a display unit 28 to cause the user to reply whether it is necessary to save a moving image file. When a reply of "unnecessary" is received from the user, the system control unit 50 causes the processing to proceed to S1002. In S1002, the system control unit 50 stores a setting value of "moving image file saving setting: OFF" in the memory 32. When a reply of "necessary" is received from the user, the system control unit 50 causes the processing to proceed to S1003. In S1003, the system control unit 50 stores a setting value of "moving image file saving setting: ON" in the memory 32. When the moving image file saving setting is ON, the moving image file is saved in the recording medium 200 in parallel with live distribution.

Although setting values are saved in the memory 32 in the present embodiment, the setting values may be saved in a system memory 52 or a non-volatile memory 56. Alternatively, when setting values set by the user are registered in advance in the non-volatile memory 56 or the like, the system control unit 50 may read the setting values registered in advance without performing the processing of S1001 to S1003.

The processing from S501 to S505 is basically the same as the processing in the first embodiment. When live distribution is started in S505, the system control unit 50 determines in S1004 whether a setting value is "ON" or "OFF" with reference to the "moving image file save setting" in the memory 32. When the moving image file saving setting is "ON", the system control unit 50 causes the processing to proceed to S1005 and starts recording a moving image. When the moving image file save setting is "OFF", no moving image is recorded.

The processing from S506 to S509 is basically the same as the processing in the first embodiment. When live distribution is started in S509, the system control unit 50 determines in S1006 whether a setting value is "ON" or "OFF" with reference to the "moving image file save setting" in the memory 32. When the moving image file saving setting is "ON", the system control unit 50 causes the processing to proceed to S1007 to generate a moving image file and save it in the recording medium 200.

According to the configuration of the present embodiment described above, it is possible to achieve the same operations and effects as those in the first embodiment. In the present embodiment, a moving image to be live-distributed can be saved as a moving image file, and thus it is possible to check moving images that were live-distributed in the past and to reuse them for other purposes. Thus, it is possible to provide a high-value-added imaging device with excellent usability.

Figure 11:
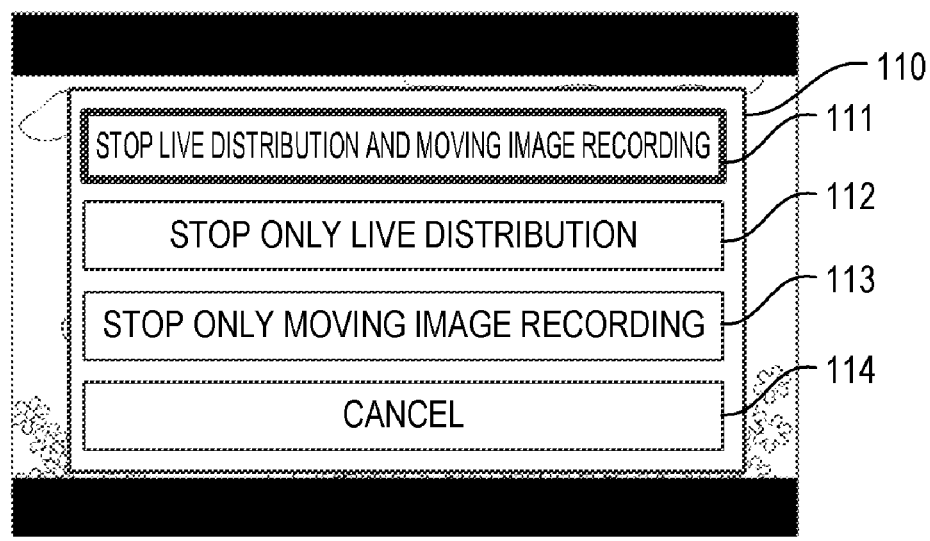
FIG. 11 is an example of a confirmation screen when an instruction to stop live distribution is received.

Also in the present embodiment, the user may set whether stopping confirmation in a live distribution mode is necessary as in the second embodiment. When two processes of live distribution and moving image recording are executed simultaneously as in the present embodiment, the user may confirm which process among a plurality of processes being executed may be stopped in the stopping confirmation processing of S507. FIG. 11 is an example of a live distribution stop guide 110 (confirmation screen) in which processing to be stopped can be selected. When the system control unit 50 receives a stop instruction while both live distribution and moving image recording are performed, the system control unit 50 displays the live distribution stop guide 110 as illustrated in FIG. 11 on the display unit 28. When the user touches a "stop live distribution and moving image recording" button 111, the system control unit 50 executes both live distribution stop processing (S509, S510) and moving image recording stop processing (S1007). When the user touches a "stop only live distribution" button 112, the system control unit 50 executes only the live distribution stop processing (S509, S510) and continues capturing and recording of moving images. When the user touches a "stop only moving image recording" button 113, the system control unit 50 executes only the moving image recording stop processing (S1007) and continues capturing and live distribution of moving images. When the user touches a "cancel" button 114, the system control unit 50 continues capturing, recording, and live distribution of moving images. Usability can be further improved by making it possible to select a process to be stopped from among processes being executed in this manner.

Fourth Embodiment

In the first embodiment, control of executing stopping confirmation processing when receiving any one user operation out of pressing the moving image button 76 and touching the capturing stopping touch button 701 in the middle of live distribution processing is performed. On the other hand, in the second embodiment, stopping control of not executing stopping confirmation processing in the case of a stop instruction given by pressing the moving image button 76, and executing stopping confirmation processing only in the case of a stop instruction given by touching the capturing stopping touch button 701 is performed. Hereinafter, description overlapping the above-described embodiment will be omitted, and a configuration characteristic of the present embodiment will be mainly described.

Figure 12:
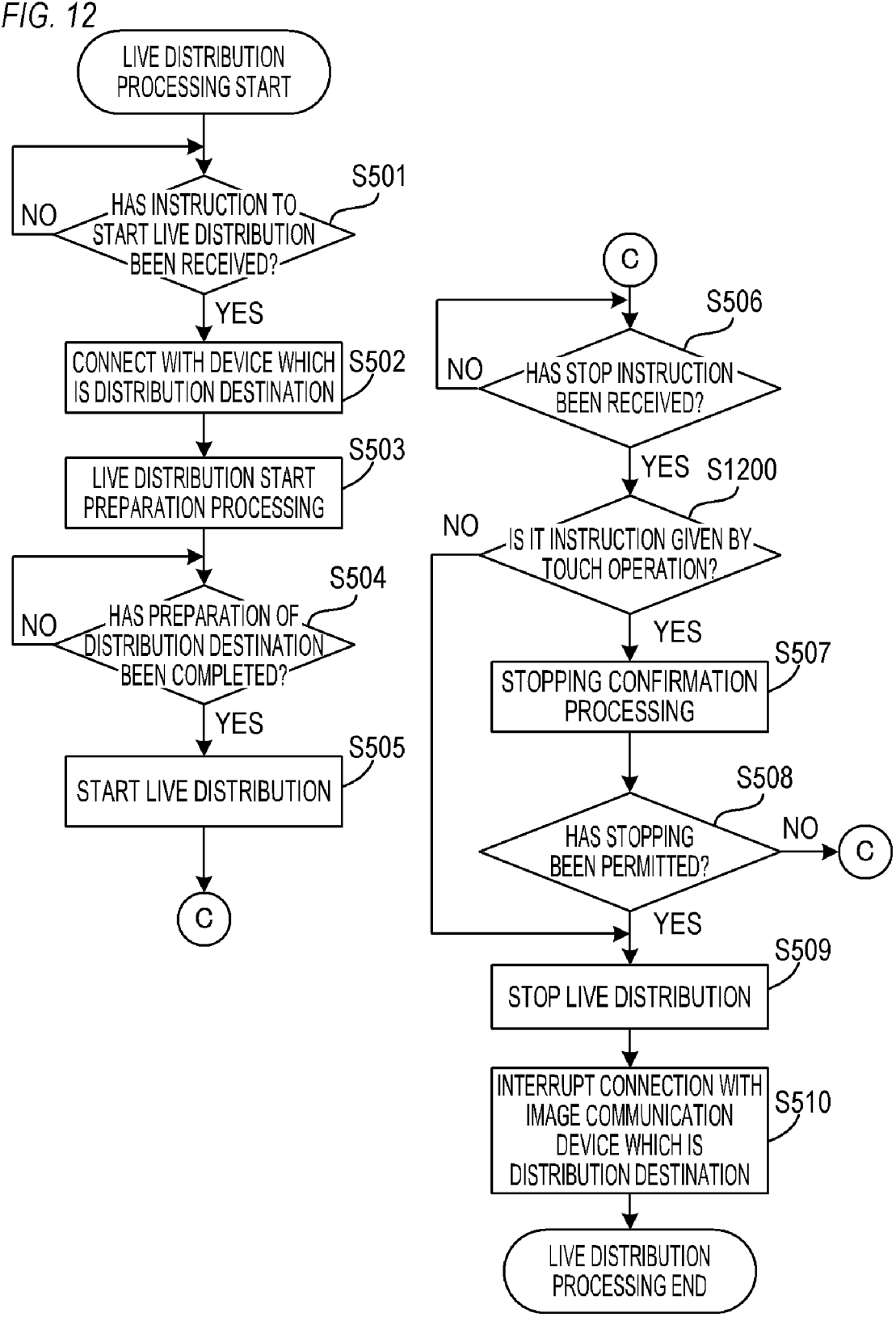
FIG. 12 is a flowchart of control of a live distribution mode in a fourth embodiment.

FIG. 12 is a flowchart showing an example of control of a live distribution mode executed by a system control unit 50 in a fourth embodiment. In the flowchart of FIG. 12, the same step numbers as those in the flowchart of FIG. 5 are attached to the same processing as in the first embodiment.

The processing from S501 to S506 is basically the same as the processing in the first embodiment. When it is determined in S506 that a stop instruction has been received from a user, the system control unit 50 causes the processing to proceed to S1200. In S1200, the system control unit 50 determines whether the stop instruction received in S506 is given by pressing a moving image button 76 or by touching an capturing stopping touch button 701.

When the stop instruction is given by pressing the moving image button 76 (NO in S1200), the system control unit 50 performs control of immediately stopping moving image capturing and live distribution without executing stopping confirmation processing (S509). In the case of a physical button such as the moving image button 76, it is necessary to press down the button with a certain amount of force, and thus an erroneous operation is generally unlikely to occur. For this reason, it is highly probable that the stop instruction given by operating the moving image button 76 is not an erroneous operation but the user's intended stop instruction. Thus, in the case of a stop instruction given by pressing the moving image button 76, control of giving priority to operability is performed.

On the other hand, when the stop instruction is given by touching the capturing stopping touch button 701 (YES in S1200), the system control unit 50 causes the processing to proceed to S507 and executes stopping confirmation processing. Then, the system control unit 50 performs control of stopping the live distribution (S509) when the user permits the stopping of live distribution (YES in S508), and continues the live distribution when the stopping of live distribution is rejected (NO in S508). In the case of a virtual button displayed on the touch screen, such as the capturing stopping touch button 701, an erroneous operation is likely to occur due to an unintentional touch of a part of the body or the like. For this reason, in the case of a stop instruction given by touching the virtual button, control of giving priority to prevention of an erroneous operation is performed.

According to the configuration of the present embodiment described above, it is possible to achieve the same operations and effects as those in the first embodiment. In the present embodiment, by automatically switching whether to execute stopping confirmation processing depending on whether a virtual button is operated or a physical button is operated, it is possible to perform stopping confirmation only when an erroneous operation is likely to occur and to give priority to operability in other cases. Thus, usability can be further improved.

Also in the present embodiment, the user may set whether stopping confirmation in a live distribution mode is necessary as in the second embodiment. In the setting of whether stopping confirmation is necessary, when "necessary" is set, it may be able to select whether to execute stopping confirmation processing only when the virtual button is operated or whether to execute stopping confirmation processing when both the virtual button and a physical button are operated. Also in the present embodiment, it may be able to select processing for saving moving images to be live-distributed as a moving image file or stopping both live distribution and moving image recording during execution thereof as in the third embodiment.

Fifth Embodiment

In the fourth embodiment, stopping confirmation processing is always executed when a virtual button is touched. On the other hand, in a fifth embodiment, it is determined whether to execute stopping confirmation processing depending on the type of a touch operation. Hereinafter, description overlapping the above-described embodiment will be omitted, and a configuration characteristic of the present embodiment will be mainly described.

Figure 13:
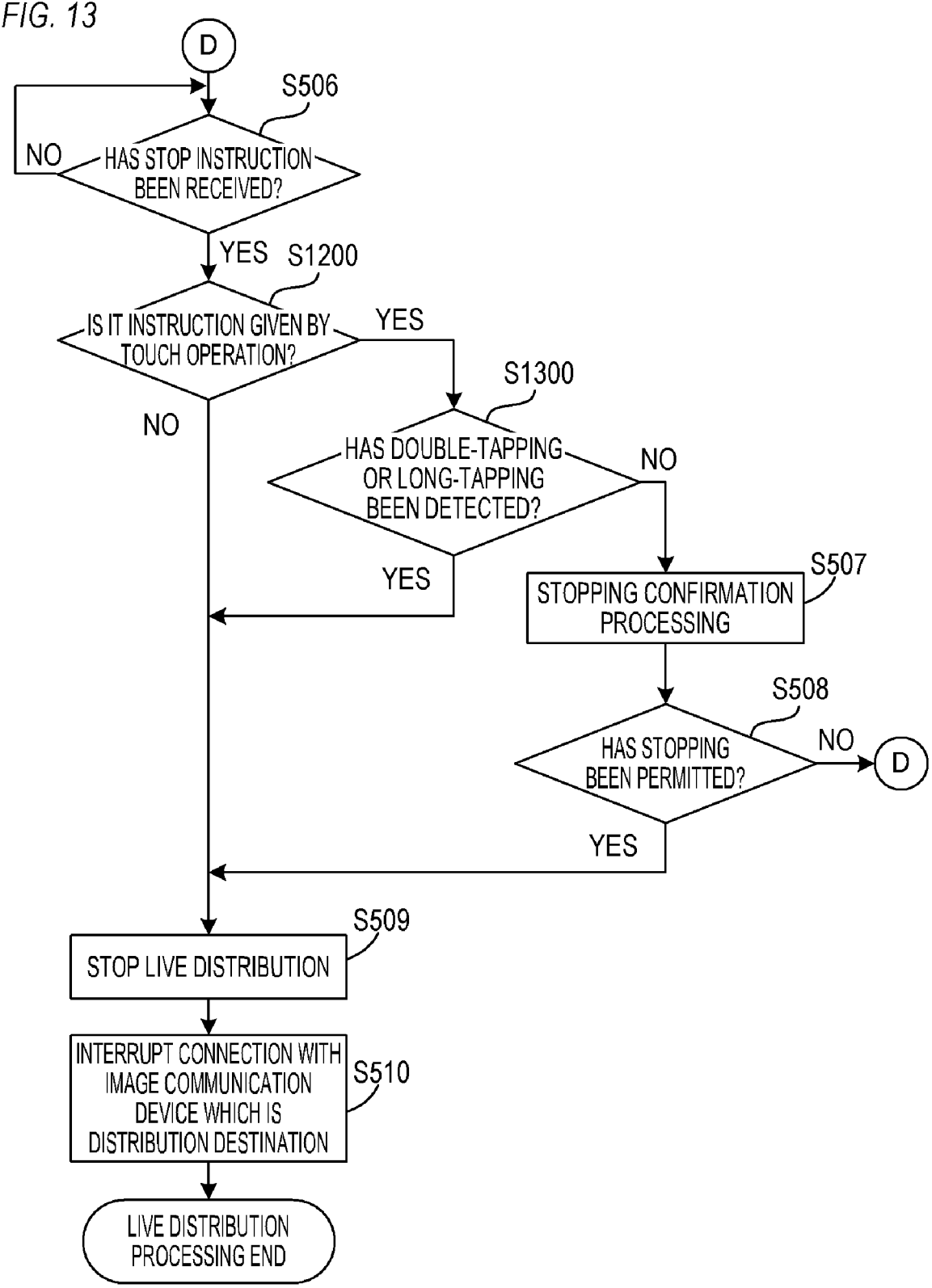
FIG. 13 is a flowchart of control of a live distribution mode in a fifth embodiment.

FIG. 13 is a flowchart showing an example of control of a live distribution mode executed by a system control unit 50 in the fifth embodiment. The flowchart of FIG. 13 is a modification example of the processing after S506 in the flowchart of FIG. 12, and is the same as the processing of FIG. 12 except that determination processing of S1300 is added.

When a stop instruction is received by touching the capturing stopping touch button 701 (YES in S1200), the system control unit 50 causes the processing to proceed to S1300 and determines the type of a touch operation. When double-tapping or long-tapping is detected as a touch operation (YES in S1300), the system control unit 50 performs control of immediately stopping moving image capturing and live distribution without executing stopping confirmation processing (S509). This is because it is highly probable that special touch operations such as double-tapping and long-tapping are not erroneous operations because the operations are required to be performed intentionally by the user. On the other hand, when no double-tapping or long-tapping is detected (NO in S1300), the system control unit 50 executes stopping confirmation processing (S507). This is because there is a possibility that touch operations other than double-tapping and long-tapping (single-tapping and the like) will occur due to erroneous operations.

According to the configuration of the present embodiment described above, it is possible to achieve the same operations and effects as those in the fourth embodiment. In the present embodiment, by automatically switching whether to execute stopping confirmation processing depending on the type of a touch operation, it is possible to perform stopping confirmation only when an erroneous operation is likely to occur and to give priority to operability in other cases. Thus, usability can be further improved.

In the present embodiment, execution of stopping confirmation processing is canceled in the case of double-tapping or long-tapping, but the double-tapping and the long-tapping are merely examples. As a touch operation for a stop instruction, a plurality of types of touch operations including a first touch operation and a second touch operation can be received, and switching may be performed such that stopping confirmation processing is executed in the case of the first touch operation, and stopping confirmation processing is not executed in the case of the second touch operation. Here, the second touch operation may be a touch operation with a more complicated operation procedure than that of the first touch operation. For example, single-tapping can be exemplified as the first touch operation. In addition to the double-tapping and the long-tapping, triple-tapping, a multi-touch (touching a plurality of points on the touch screen at the same time), a touch gesture (drawing a predetermined trajectory on the touch screen), and the like can be exemplified as the second touch operation.

Also in the present embodiment, the user may set whether stopping confirmation in a live distribution mode is necessary as in the second embodiment. That is, in the case of a stop instruction given by the first touch operation, it may be switched whether to execute stopping confirmation processing in accordance with the setting of necessity of stopping confirmation, and in the case of a stop instruction given by the second touch operation, live distribution may be stopped without executing stopping confirmation processing regardless of the setting of necessity of stopping confirmation. When there are a plurality of types of operations (a first touch operation, a second touch operation, a physical button operation, and the like), the system control unit 50 may be able to set the necessity of stopping confirmation for each type of operation. Also in the present embodiment, it may be able to select processing for saving moving images to be live-distributed as a moving image file or stopping both live distribution and moving image recording during execution thereof as in the third embodiment.

Although preferred embodiments of the present invention have been described above, the present invention is not limited to these embodiments, and various modifications and changes can be made within the scope of the gist. The configurations described in the first to fifth embodiments may be combined with each other (as long as there is no technical contradiction).

According to the present invention, it is possible to curb an unintended interruption of live distribution due to an erroneous operation as far as possible without impairing the operability of moving image capturing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-142176, filed on Sep. 7, 2022, which is hereby incorporated by reference herein in its entirety.

What is claimed is:

1. An imaging device capable of capturing a moving image, the imaging device comprising:
    a storage configured to be capable of storing data non-temporarily;
    a communication interface configured to be capable of transmitting data to an external device;
    a controller configured to perform control of each of a plurality of modes including a moving image capturing mode, in which a captured moving image is recorded as a moving image file in the storage, and a live distribution mode, in which a captured moving image is live-distributed to the external device via the communication interface; and
    an operation interface configured to be used for a user to input a stop instruction,
    wherein in a case where the controller receives the stop instruction from the operation interface in the live distribution mode, the controller performs control of executing stopping confirmation processing for confirming with the user whether to stop moving image capturing before stopping the moving image capturing, and
    in a case where the controller receives the stop instruction from the operation interface in the moving image capturing mode, the controller performs control of stopping the moving image capturing without executing the stopping confirmation processing.

2. The imaging device according to claim 1, wherein the operation interface includes a virtual button displayed on a touch screen.

3. The imaging device according to claim 1, wherein
    the user is able to set whether stopping confirmation is necessary, and
    in a case where the controller receives the stop instruction from the operation interface in the live distribution mode and setting is made under which stopping confirmation is necessary, the controller performs control of executing the stopping confirmation processing before stopping the moving image capturing, and
    in a case where setting is made under which stopping confirmation is not necessary, even if the controller receives the stop instruction from the operation interface in the live distribution mode, the controller performs control of stopping moving image capturing without executing the stopping confirmation processing.

4. The imaging device according to claim 3, wherein
    an operation of inputting the stop instruction includes a plurality of types of operations, and
    whether stopping confirmation is necessary is able to be set for each type of operation.

5. The imaging device according to claim 1, wherein
    the user is able to set whether a moving image to be live-distributed is required to be saved, and
    in a case where setting is made under which the moving image is required to be saved, the controller performs control of recording as a moving image file a moving image to be live-distributed in the live distribution mode in the storage.

6. The imaging device according to claim 5, wherein, in a case where the controller receives the stop instruction from the operation interface in the live distribution mode and both live distribution and moving image file recording are executed, the controller performs control of confirming with the user which processing out of the live distribution and the moving image file recording is to be stopped in the stopping confirmation processing.

7. The imaging device according to claim 1, wherein
    the operation interface includes a physical button and a virtual button displayed on a touch screen, and
    in a case where the controller receives the stop instruction by operation of the virtual button in the live distribution mode the controller performs control of executing the stopping confirmation processing before stopping moving image capturing, and in a case where the controller receives the stop instruction by operation of the physical button in the live distribution mode, the controller performs control of stopping moving image capturing without executing the stopping confirmation processing.

8. The imaging device according to claim 1, wherein the operation interface includes a virtual button displayed on a touch screen, and in a case where the controller receives the stop instruction by operation of the virtual button in the live distribution mode and the operation performed on the virtual button is a first touch operation, the controller performs control of executing the stopping confirmation processing before stopping moving image capturing, and in a case where the controller receives the stop instruction by operation of the virtual button in the live distribution mode and the operation performed on the virtual button is a second touch operation, the controller performs control of stopping moving image capturing without executing the stopping confirmation processing.

9. The imaging device according to claim 8, wherein the user is able to set whether stopping confirmation is necessary, and in a case where the controller receives the stop instruction by operation of the virtual button in the live distribution mode and the operation performed on the virtual button is a first touch operation, the controller switches between whether or not to execute the stopping confirmation processing in accordance with setting of necessity of stopping confirmation, and in a case where the controller receives the stop instruction by operation of the virtual button in the live distribution mode and the operation performed on the virtual button is a second touch operation, the controller performs control of stopping moving image capturing without executing the stopping confirmation processing regardless of setting of necessity of stopping confirmation.

10. The imaging device according to claim 8, wherein the second touch operation is a touch operation having a more complicated operation procedure than that of the first touch operation.

11. The imaging device according to claim 8, wherein the first touch operation includes single-tapping, and the second touch operation includes double-tapping or long-tapping.

12. A control method for an imaging device having a moving image capturing mode for non-temporarily recording as a moving image file a captured moving image on a storage and a live distribution mode for live-distributing a captured moving image to an external device, the control method comprising:

receiving a stop instruction input by a user using an operation interface;

performing control of executing stopping confirmation processing for confirming with the user whether to stop moving image capturing before stopping the moving image capturing, in a case where the stop instruction is received from the operation interface in the live distribution mode; and performing control of stopping the moving image capturing without executing the stopping confirmation processing, in a case where the stop instruction is received from the operation interface in the moving image capturing mode.

13. A non-transitory computer readable medium that stores a program, wherein the program causes a computer to execute a control method for an imaging device having a moving image capturing mode for non-temporarily recording as a moving image file a captured moving image on a storage and a live distribution mode for live-distributing a captured moving image to an external device, the control method comprising:

receiving a stop instruction input by a user using an operation interface;

performing control of executing stopping confirmation processing for confirming with the user whether to stop moving image capturing before stopping the moving image capturing, in a case where the stop instruction is received from the operation interface in the live distribution mode; and performing control of stopping the moving image capturing without executing the stopping confirmation processing, in a case where the stop instruction is received from the operation interface in the moving image capturing mode.

\* \* \* \* \*